Jan. 5, 1937.   C. F. RITCHIE ET AL   2,066,577
COOLING APPARATUS
Original Filed July 16, 1929
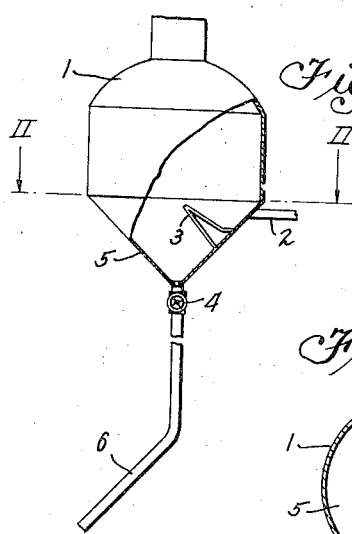
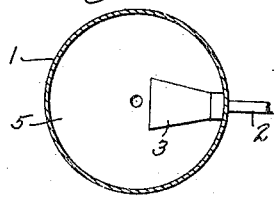
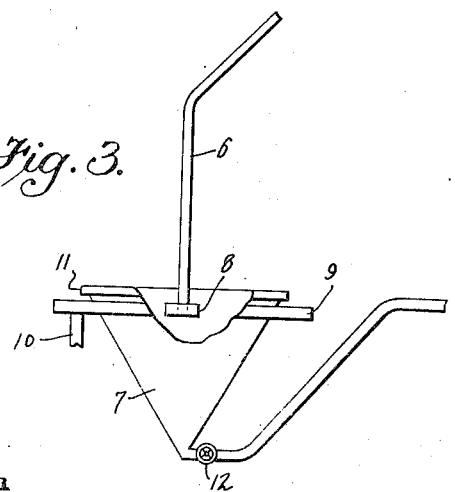
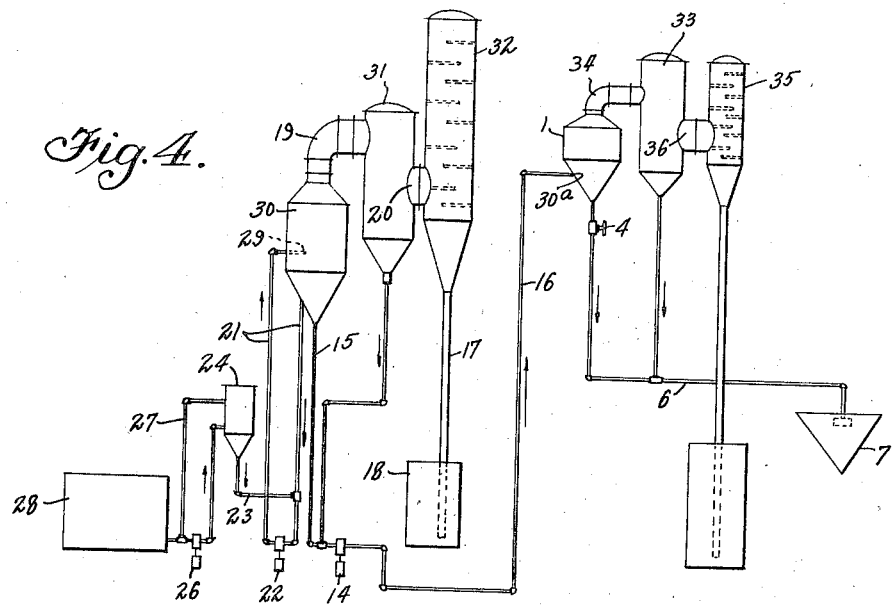
Charles F. Ritchie
William A. Gale
William H. Allen
Inventors
By Lyon & Lyon
Attorneys Patented Jan. 5, 1937

2,066,577

UNITED STATES PATENT OFFICE 2,066,577

COOLING APPARATUS

Charles F. Ritchie, William A. Gale, and William H. Allen, Trona, Calif., assignors to American Potash & Chemical Corporation, Trona, Calif., a corporation of Delaware Original application July 16, 1929, Serial No. 378,745. Divided and this application November 7, 1932, Serial No. 641,574

4 Claims. (Cl. 23—273)

This invention relates to an apparatus utilized in the separation of potassium chlorid, (potash), from liquors containing the same, together with borax. In particular, this invention relates to an apparatus used in the precipitation of potassium chloride from liquors which likewise contain sufficient borax to cause, under normal conditions of operation, a precipitation of both potassium chloride and borax.

This application is a division of our co-pending application, Ser. No. 378,745, filed July 16, 1929, now Patent 1,921,481.

One object of the present invention is to provide an efficient and economical system for rapidly cooling a hot concentrated solution of potassium chlorid and borax, thereby bringing about precipitation of potassium chlorid and simultaneously producing a state of supersaturation with respect to borax.

Another object of the invention is to provide a system in which the desired results may be achieved to the best advantage, at the same time producing crystals of potassium chlorid of superior quality with respect to size.

Other objects and advantages of the invention will appear as the description proceeds.

While the present invention is described in terms of potassium chloride and borax, it is obvious that the system of procedure and equipment hereinafter described may be of value for the manipulation of any similar liquor having like characteristics.

Time is the essence of the basic principle, as set forth in the prior art of United States Letters Patent No. 1,343,401, involved in the precipitation of potassium chlorid and the simultaneous supersaturation of the liquor with respect to borax. By cooling hot concentrated liquor very rapidly, potassium chloride may be caused to separate without substantial precipitation of borax. The faster the cooling and the shorter the time of subsequent retention of the supersaturated liquor, the greater will be the satisfaction derived from the process.

The desirability of evaporative cooling procedure has been known for some time. Its advantages, as applied to the rapid cooling of potassium chloride liquor, are set forth herein, together with such improvements to equipment, of the prior art, as specified in United States Letters Patent No. 1,676,277, as render the equipment most efficient for producing results superior to those heretofore obtainable.

Hot concentrated liquor containing potassium chloride and borax may be produced by the high temperature evaporation of Searles Lake or like brines. A similar liquor may also be produced by the high temperature leaching of solar evaporation salts, containing valuable quantities of potassium chloride and borax. Hot concentrated liquor resulting from the high temperature evaporation of Searles Lake brine, together with certain end liquors from previous manipulations, may have the following percentage composition, when ready for cooling for potassium chloride precipitation:

|  | Per cent |
|---|---|
| KCl | 18.8 |
| $Na_2B_4O_7$ | 5.9 |
| $Na_2B_2O_4$ | 1.2 |
| $Na_2CO_3$ | 7.8 |
| $Na_2SO_4$ | 1.7 |
| NaCl | 7.1 |
| Unreported | 2.6 |
| Water | 54.9 |
| Total | 100.0 |

For the most efficient operation of a process recovering potassium chloride and borax from Searles Lake and similar brines, it is the practice to produce a hot concentrated liquor essentially saturated with the potassium compound. Other components appear in the hot concentrated liquor in such quantities as may result from the phase rule solubility relationships or as may be determined by the relative quantities in the original brine. A small quantity of water is usually added to the concentrated liquor to compensate the water evaporated, thereby preventing the precipitation of undesirable salts upon evaporative cooling.

Liquor of the above composition may be cooled to relatively low temperatures without precipitation of components other than potassium chloride salts and borax. By the process of the prior art of United States Letters Patent No. 1,343,401, such hot concentrated liquor is rapidly cooled, thereby bringing about precipitation of potassium chloride and incurring supersaturation with respect to borax. After the removal of a precipitated potassium, by means of a filter or a centrifugal machine the borax is caused to precipitate by seeding, further cooling or prolonged retention, and thereafter removed from the liquor. The remaining mother liquor, containing valuable potassium chloride and borax concentrations, is returned to the evaporation or leach system.

We have carried out the rapid cooling of hot concentrated potassium chloride liquor in the conventional type of heat transfer equipment, for example, in tanks containing pipes through which a cooling liquid is caused to circulate, otherwise known as indirect coolers. While such equipment produces acceptable results, it has been found that evaporative cooling equipment is far superior, both with respect to economy of equipment and operation and also with respect to the results produced. While the advantages of an evaporative cooler are manifold as compared with indirect coolers, its greatest advantages, in the present instance, reside in the following: provision of a hermetically sealed system, freedom from excessive crystal deposits and large handling capacity, resulting in relatively short time of liquor retention.

We have found that one of the contributing causes to the destruction of the supersaturation of liquor with respect to borax is the infiltration of borax laden air into the cooling tanks. In a plant manufacturing borax, it is impossible to prevent a certain amount of fine borax from being dispersed into the air. When fine borax crystals are brought into contact with liquor supersaturated with respect to borax, the liquor is said to become inoculated, and crystallization ensues. In the old style cooling tanks, which were usually open to the air and operated in a discontinuous or batch manner, the supersaturated liquor often became seeded, and borax crystallization resulted. The use of continuous evaporative cooling equipment to a large extent, prevents trouble from this source. In continuous, reduced-pressure, evaporative cooling equipment outside air, usually laden with borax particles, is rigidly excluded. Hence the maintenance of borax supersaturation in the liquor, so vital to the successful operation of the process, is more easily and completely realized in evaporative cooling equipment, than in the indirect cooling equipment of the prior art.

Excessive crystal deposits which form upon heat transfer units of the conventional type of indirect coolers constitute a liability to smooth, continuous operation. Wash water must be supplied for the removal of such deposits, thereby causing a loss of the valuable crystals, as well as holding up operations, involving extra labor expense, et cetera. The use of properly designed evaporative cooling equipment, such as that specified in United States Letters Patent No. 1,676,277, almost entirely eliminates the formation of crystal deposits. Furthermore, due to the mechanism of the heat transfer involved in the latter case, excessive local cooling is prevented.

The present inventors have successfully operated such equipment for long periods without appreciable crystal deposition. Furthermore, we have found that more complete and dependable supersaturation of the liquor with respect to borax may be maintained than with indirect coolers. The use of evaporative coolers has proven eminently more satisfactory for conducting the process of United States Letters Patent No. 1,343,401, than coolers known to the prior art.

Time is the essence of the above process. Due to the inherent features of indirect coolers it is difficult to cool large volumes of liquor in much short of 1-2 hours. Although desired results were obtainable by this method, it often happened that, for one cause or another, the supersaturation of the liquor was destroyed and borax crystallization took place. Such occurrences, of course, required the rejection of a certain amount of potassium chloride, as well as a complete washout of the system with hot water. The capacity of evaporative cooling equipment is materially greater than indirect cooling equipment, due in part to the better heat transfer mechanism involved and likewise to the fact that the efficiency of heat transfer remains constant regardless of the length of time the equipment has been in operation. In the old style indirect coolers, fitted with an excessively large cooling area, from 1 to 2 hours was required to cool a 3000 gallon batch of liquor. We have operated a normally designed evaporative cooler, holding 3000 gallons of liquor, over extended periods at the rate of 100 gallons per minute, with results far superior to those obtained in the former case. The average time of retention of liquor within such a cooler is theoretically 30 minutes. For carrying out the process of United States Letters Patent No. 1,343,401, evaporative coolers are in many ways superior to indirect coolers.

By the apparatus of the present invention, hot concentrated potassium chloride liquor is cooled from its high temperature of production to the desired low temperature entirely by evaporative cooling. Furthermore, said cooling is accomplished in two steps, both embracing evaporative cooling. This scheme possesses a combination of practical advantages over prior efforts where the operation has been attempted in a singe step, or by other means different from the present invention.

Hot concentrated liquor produced, from Searles Lake or similar brines, for the recovery of high grade potassium chloride is essentially saturated with KCl at a high temperature, 200–240° F. However, such liquor seldom contains sufficient borax to produce saturation at that temperature. The liquor of the above analysis was found to be saturated with respect to borax at approximately 130° F.; this temperature will, of course, differ with variations of the processes employed, but it is advantageous to maintain it as low as possible. We take advantage of this fact in the operation of the improved process of this invention. By cooling only to the saturation point with respect to borax in the first step of evaporative cooling no liability of crystallization is incurred. The system is hermetically sealed; so no borax seed is allowed to enter the system, causing precipitation of borax in the subsequent cooling step. In this cooling from 200–230° F. to approximately 130° F. the greater portion of the sensible heat of the liquor is removed and the greater portion of the potassium chloride available is precipitated. Since borax crystallization is impossible at this temperature, equipment such as that specified in United States Letters Patent No. 1,676,277 may be successfully employed.

The advantages of such equipment for cooling, in general, have been set forth hereinabove. The advantages of the circulation of sludge, as provided by that equipment are set forth below in connection with certain improvements we have made to that end.

We have found that, aside from the various factors, hereinabove mentioned, contributing to the destruction of the supersaturation of borax, there exists another factor which is likewise very active. This is the force known to those of the crystallization art as mechanical stimulus. The phenomena of mechanical stimulus is utilized by nearly every chemist who, desiring to bring about precipitation of a supersaturated component, scratches the sides of a beaker with a stirring rod or similar object. We have found that mechanical stimulus may be brought into play in commercial equipment in several ways. Centrifugal pumps (and others) are very detrimental to the stability of a supercooled borax solution. Also, we have found that forcing liquor, especially one containing solids (potassium chloride) through excessive lengths of pipe lines is effective in destroying the supersaturation characteristics of the component in question (borax). We do not believe this effect due to an unreasonably long time of retention; for the effect is even more pronounced as the rate of flow of the sludge of potassium chloride and liquor supersaturated with borax is increased within the pipes. It is one of the purposes of the process of this invention to provide means for rapidly cooling potassium chloride liquor, simultaneously supersaturated with respect to borax, in which mechanical stimulus is reduced to a minimum.

In the preferred form of our invention, we employ a condensing medium consisting of a saturated brine, of the lowest temperature economically obtainable, for producing the desired reduction in temperature in the final evaporative cooler. The use of this improved condensing medium has enabled us to carry the temperature of the liquor 12° F., or more, lower than would have been possible with condenser water of economical origin. By this method we are able to conduct the cooling of concentrated potassium chloride liquor containing borax to the desired temperature without the use of expensive artificial refrigeration, as has been required under certain conditions of past practice.

Furthermore, by combination of the aforementioned improved condensing medium, together with the improved equipment of this invention, we are able to produce a most satisfactory degree of supersaturation of borax within the liquor. In the equipment of our invention the final cooling is carried out in such a manner that forces producing mechanical stimulus are reduced to a minimum.

The present invention, together with various objects thereof, will best be understood from a description of one form or example of an apparatus embodying the invention. There is, therefore, hereafter described with reference to the accompanying drawing the preferred form or example of an apparatus embodying this invention.

In the drawing, Figure 1 shows an elevation of a suitable secondary evaporative cooler, having a section cut away to show certain interior construction, and Figure 2 represents a plan of the same taken through line 2—2. Figure 3 shows an elevation of the settler and certain associated parts, portions being broken away. Figure 4 shows a diagrammatic elevation of the combination of equipment for carrying out the process.

Referring to the drawing, we provide a relatively small chamber 1, having considerable dome space above the point of liquor inlet 2, to prevent undue splashing and entrainment of the liquor with the ascending vapors. A baffle plate 3 is provided to spread the incoming liquor and prevent short circuiting. The cooler is so designed and arranged with respect to other existing equipment that only a very small volume of liquor is maintained within the equipment. All methods of circulation are rigorously avoided in the construction of this secondary evaporative cooler. Liquor enters the cooler continuously through port 2, is immediately cooled and passes out through outlet valve 4. Level of the liquor is maintained as shown by the dotted line 2—2, at or near the level of the inlet port 2. As a specific example of one piece of equipment and a procedure which we have employed for this final or secondary cooling, the following is given. Liquor at the temperature of 130° F. was delivered to the secondary cooler, Figure 1, at the rate of approximately 150 g.p.m. The bottom of the cooler comprised a 52½° circular cone, as shown by 5 of Figure 1. The level of the liquor was held to such a height that the cone contained approximately 600 gallons during normal operating conditions. Liquor was cooled by evaporative means to 90° F. The time of retention was, therefore, approximately 4 minutes. Circulation and other effects producing mechanical stimulus were reduced to a minimum. The difficulties encountered with processes and equipment prior to the inception of this invention are entirely overcome by this scheme, a most desirable and dependable supersaturation with respect to borax being maintained at all times.

While in the past the element of time and various physical elements have been believed to be the controlling factors in the production of a satisfactory degree of supersaturation with respect to borax, we have found that a certain physical chemical phenomenon is also involved in the process. Two hydrates of borax are known to exist between the cryohydric point and the boiling point of saturated solutions under ordinary pressure conditions. These hydrates are the pentahydrate ($Na_2B_4O_7.5H_2O$) and the decahydrate ($Na_2B_4O_7.10H_2O$). The transition point of the hydrates in pure water is approximately 143° F. In complex liquors such as those resulting from the evaporation and manipulation of Searles Lake and similar brines, the transition temperature is materially lowered. The transition temperature of the pentahydrate to decahydrate in liquor of the preceding composition has been found to be approximately 86–90° F. At temperatures above the transition point the pentahydrate is stable and will be precipitated when borax is crystallized above this temperature. At temperatures below the transition point the decahydrate is stable and will be crystallized when borax is crystallized below this temperature.

We have found that the supersaturation of borax is much less stable at temperatures favorable to the formation of decahydrate borax than at temperatures favorable to the formation of pentahydrate borax, the degree of supersaturation being constant. In other words, it has been found much easier to produce and maintain a supersaturation of 5 per cent $Na_2B_4O_7$ at 90–100° F. than to produce and maintain a supersaturation of 5 per cent in the temperature region of 75–85° F.

Since it is the usual practice to recycle liquor back to the evaporator or leach system after removing a crop of potassium chloride and borax, it may be seen that it makes little difference from an efficiency standpoint whether the liquor be cooled slightly above or slighly below the transition point. However, from the standpoint of maintaining a satisfactory degree of supersaturation within the liquor being cooled this point is of paramount importance. Hence, for the purpose of precipitating potassium chloride from concentrated liquor and simultaneously incurring a satisfactory supersaturation with respect to borax, we have found it advisable to limit the temperature of cooling to a minimum point, approximating the transition temperature. We have attempted to cool potassium chloride liquor to a temperature considerably below the transition point of the two hydrates of borax; but have found the resulting supersaturated liquor to be extremely unstable, decahydrate borax being precipitated upon the slighest provocation. Hence, in the preferred form of this invention it is specified that the liquor be cooled only to a minimum approximating the transition point of the two hydrates of sodium tetraborate.

The present invention provides means for economically and rapidly cooling hot concentrated potassium chloride liquor containing borax, wherein a most satisfactory supersaturation of borax is maintained. The success of the present invention resides largely in the means provided for avoiding destruction of supersaturation by mechanical stimulus. The equipment of the present invention provides further means for maintaining the desired supersaturation between the point of its production and the point of separation of potassium chloride from the cold sludge.

When liquor of the preceding composition is cooled as specified herein, to a minimum of 86° F., the resulting sludge of supersaturated liquor and potassium chloride crystals contains approximately 1.1 pounds of potassium chloride crystals per gallon of sludge, or approximately 10% solids by weight. Such a sludge is thinner than can be satisfactorily handled in commercial filters or centrifugals. In order to provide a thicker sludge for such equipment, it has been found necessary to thicken the attenuated product obtained from the coolers. This step not only produces a more satisfactory sludge for centrifugal or filter feed, but also removes a large proportion of the supersaturated liquor from the sphere of the precipitated potassium chloride, thereby reducing the possibility of precipitation of borax.

It has been pointed out that liquor supersaturated with respect to borax has been found to be very susceptible to mechanical stimulus produced by pumps. In order to avoid this undesirable effect, we so arrange the secondary cooler of this invention with respect to the settling or thickening equipment, that no mechanical handling will be required. Referring to Figure 1, the cooled liquor is passed continuously from the secondary evaporative cooler 1, down line 6 to a suitable settler 7 of Figure 3. We prefer to employ a settler of the simplest possible construction. Since undue liquor retention is not desired, the volume of the settler is maintained as small as possible. A 45° or 60° conical section has been found quite satisfactory for this service. Agitators or scrapers are avoided unless the nature of the sludge is found to be such as to require their installation within the settler.

The secondary evaporative cooler 1 of Figure 1 is placed above the settler 7 of Figure 3, in such a manner that sludge will flow by gravity into the settler. The elevation of the cooler above the settler is such that the column of liquor in the connecting line 6 will be sufficient to balance the reduced pressure inside the evaporative cooling equipment with the existing atmospheric pressure.

Referring to Figure 3, pipe 6 terminates into a distributing cup 8 placed beneath the surface of the liquor in the settler 7. This cup or similar device serves to deflect the downward force of the liquor, preventing undue turbulence in the lower portions of the settling cone. As sludge is passed through cup 8 into the settler 7, liquor flows from the center toward the outside edge and into launder 9 from whence it may be withdrawn through outlet 10. A leveling ring 11 may be provided for causing uniform distribution of the overflowing liquor, or other similar devices may be employed. As liquor passes transversely from the central cup 8 toward the launder 9, potassium crystals settle into the bottom of the cone. A thickened sludge may be withdrawn at the bottom by means of a valve 12, a suitable orifice, a balanced density valve or other similar mechanisms. In this manner, we are able to combine the usual barometric seal with the necessary settling equipment, thereby obtaining results superior to those heretofore obtainable. The elimination of pumps, made possible by this combination, has eliminated difficulties previously encountered, resulting from the destruction of the borax supersaturation of the cold liquor by mechanical stimulus.

The equipment of United States Letters Patent No. 1,676,277 has been found to be well suited to the primary cooling of hot concentrated potassium chloride liquor to the point of saturation with borax. During such cooling a large proportion of the available potassium chloride is precipitated. In order to increase the efficiency of the subsequent settling operations, as well as those of filtering or centrifuging and drying, it is desirable to produce a potassium chloride crystal of relatively large size and good structure. It has been found that if concentrated potassium chloride liquor be subjected to flash evaporation (cooling) very fine crystals are produced. The thermal circulation specified in the above-mentioned patent, has been found of value in producing relatively larger potassium chloride crystals than those obtainable when flash evaporation is tolerated. Large amount of cold liquor is mixed with small amount of hot liquor, thereby preventing undue flashing.

Other advantages of the circulation of liquor have also been set forth. We have found that if a small quantity of hot concentrated liquor be mixed with a large quantity of cooled liquor containing suspended potassium chloride crystals and the resulting mixture at a relatively low temperature be introduced into the evaporative cooler, the ebullition takes place in a regular and orderly manner. The presence of the large quantity of potassium chloride crystals, provided by such circulation, causes the potassium chloride content of the hot liquor to be deposited, to a large extent, upon the potassium chloride crystals already present resulting in the production of the desirable large crystal potassium chloride.

We have been able to increase the desirable effect of sludge circulation in the primary step of the process of evaporative cooling by supplying a pump in the closed circuit comprising the depending legs and the evaporative cooler.

Referring to Figure 4, the prescribed circulation pump is shown as 22 placed in the closed circulation system comprising pipes 21. Heretofore, thermal circulation has been employed. While for the most part satisfactory, the rate of flow, in many cases, has been found to be insufficient for bringing out the maximum desired effects. Also, in the case of thermal circulation some difficulty has been experienced with short circuiting; a reversal of flow direction taking place probably due to slight obstructions in the discharge side of the closed circulation system, resulting in hot liquor being passed from the system through the outlet normally handling cooled liquor. The satisfactory utilization of forced circulation in the primary step of evaporative cooling of hot concentrated potassium chloride liquor containing borax is made possible by limiting the temperature of cooling therein to the temperature of saturation with respect to borax. By this method, all possibility of borax precipitation is eliminated and conditions most favorable to the crystallization of potassium chloride may be realized. Large size equipment may be employed, thereby reducing the capital outlay required. For example, we have found that a primary evaporative cooler suitable for cooling 100 gallons per minute of hot concentrated potassium chloride liquor from 230° F. to 130° F. may be of 3000 gallons (net) capacity. The average time of retention of liquor within the cooler is theoretically 30 minutes. However, due to the continuous mixing and circulation, some liquor is retained even a greater length of time. Such equipment, if operated for cooling to the desired low temperature in a single step is not satisfactory; crystallization of borax being the inevitable result.

The foregoing sets forth the nature and advantages of the process of this invention as applied to the problem of producing satisfactory potassium chloride crystals from hot concentrated liquor containing the same together with borax, simultaneously incurring a satisfactory supersaturation in the liquor with respect to borax. The elevation of Figure 4 sets forth a combination of equipment in its proper order, suitable for carrying out the improved process of this invention.

In Figure 4, 28 represents a suitable tank for storing the hot concentrated liquor essentially saturated with potassium chloride and containing appreciable quantities of borax. Liquor is withdrawn from this storage tank by means of a pump 26. In the preferred form of the invention, we employ a constant level tank 24 for maintaining a continuous, constant, automatic feed to the primary evaporative cooler. Such a tank, of a suitable design, is supplied with hot liquor by a pump 26, in excess of that required by the cooler. Excess liquor flows back through a line 27 to the storage tank 28, or into the suction side of the pump 26, as shown. The constant level tank 24 is so placed with respect to the evaporative cooler 30 that the reduced pressure will maintain the level of the liquor therein at a predetermined height.

In accordance with the advantages hereinbefore described, a pump 22 is employed for circulating sludge from the primary evaporative cooler, mixing it with a small proportion of hot liquor and returning it to the evaporative cooler. To this end, hot liquor from the constant level tank 24 is led into the suction side of the circulation pump 22.

In the layout herein described the circulation pump 22 is made of 600 gallons per minute capacity. One hundred gallons per minute of hot liquor are introduced through line 23, the warm mixture entering the evaporative cooler at some convenient point, as shown at 29.

The inlet port 29 may be caused to enter the chamber 30 tangentially thereby producing a swirling motion of the contents thereof, causing thorough mixing and preventing excessive splashing and foaming. Level of the liquid is usually maintained considerably above the point of inlet 29, the evaporative cooler being designed to allow sufficient dome space for preventing excessive splashing and entrainment of liquor with the vapors passing out through line 19. By maintaining the level of the liquid considerably above the inlet 29 flashing is avoided even when a rapid circulation of brine is employed. A single primary evaporative cooler of the present invention may contain approximately 3000 gallons of liquor, the cylindrical section being 8 feet in diameter.

A separator 31 is provided for recovering liquor passing over with the vapors, and is connected by a vapor line 20 with a barometric condenser 32. Said barometric condenser may be of standard design. In the particular process of this invention it is supplied with any suitable water of such a volume as is required to bring about cooling at the desired rate. Heated condenser water passes down the barometric leg 17 into a hot well 18, from whence it may be removed by means of a suitable pump, not shown, and sent to atmospheric cooling towers for reconditioning. A vacuum pump or jet exhauster, not shown, is usually provided in conjunction with the barometric condenser for the removal of non-condensable gases.

Liquor is cooled in the chamber of the primary evaporative cooler 30 to a temperature approximating the point of saturation with respect to borax, i. e., under the aforementioned conditions, to approximately 130° F. Cooled liquor (sludge) is removed by means of line 15 and pump 14 and delivered to the second step of the improved evaporative cooling process of this invention via lines 16 and 2. Liquor trapped in the separator 31 may also be returned by means of a suitable line to the suction side of the transfer pump 14, or other suitable disposition may be made thereof.

While sludge may be obtained for delivery to line 16 from the circulation leg 21, we prefer to provide a separate line, as shown; removing the sludge from the apex of the cone forming the bottom of the primary evaporative cooler 30.

The product from the primary evaporative cooler 30 is delivered continuously to the secondary evaporative cooler 1. Details of the construction and operation of the secondary evaporative cooler have been set forth hereinbefore and are illustrated in Figures 1 and 2. Only a small volume of liquor and no circulation or undue agitation are maintained in the secondary evaporative cooler. In the case which has been successfully operated and is being described, 150 gallons per minute of liquor at approximately 130° F. are supplied from primary evaporative coolers. Liquor level is maintained within the 52½° conical section approximately at the level of the inlet port 30ª; about 600 gallons of liquor being withheld.

A separator 33 is provided for recovering liquor entrained with the vapors passing off the cooler through vapor line 34. The separator is connected with a barometric condenser 35 by means of vapor line 36.

Barometric condenser 35 may be of standard design. In the preferred form of this invention we service the barometric condenser 35 with a saturated brine. By the use of this saturated brine in place of the usual medium (water) we are able to maintain the temperature of the liquor within the secondary evaporative cooler 1 at least 12° F. lower than is possible with water at the same temperature. In this second cooling step of this improved process liquor is cooled to a temperature approximating the transition point of the two hydrates of borax, or in the present liquor to approximately 90° F.

Cold liquor passes continuously from the secondary evaporative cooler 1 through line 6 into the continuous cone settler 7. The advantages and design of the settler 7 have been described hereinbefore and are illustrated by Figure 3. Within the settler 7 the large crystals of potassium chloride produced for the most part by the cooling and manipulation within the primary evaporative cooler 30, settle rapidly to the bottom, from whence they may be removed as a thickened sludge for the final recovery of high grade potassium chloride. Clear liquor overflows and is utilized in suitable processes embracing the recovery of borax, the end liquor being returned to the evaporation or leach system for further recovery of the valuable constituents.

Figure 4 and the description thereof represents in a somewhat conventional manner the improved process of the present invention. It must be understood that only single units have been shown and many common devices used in connection therewith have been eliminated for the purpose of simplicity. In commercial practice, we may employ a series of primary evaporative coolers in parallel, thereby lending flexibility to the system. The same is true in the case of the secondary evaporative coolers. In a specific installation, we have employed three primary evaporative coolers in parallel, feeding 100 g.p.m. of liquor to each, followed by two secondary evaporative coolers in parallel, feeding 150 g.p.m. of the partially cooled liquor to each. Other combinations may be made without departing from the scope of the present invention.

Observation ports, level gauges, thermometers, regulation valves, vacuum regulators, et cetera, have been omitted from the description, since such equipment is of common knowledge and always employed by competent engineers in the design of such equipment, where required.

We claim:

1. An apparatus for cooling liquor, comprising an evaporator, means for maintaining said evaporator under reduced pressure, means for forcibly circulating liquor from said evaporator and back into said evaporator, means for introducing fresh brine into said circulating means, a second evaporator, means for passing brine from the first evaporator to the second evaporator, and means for maintaining said second evaporator under reduced pressure, said second evaporator being of relatively small capacity, a sludge thickening means, and means for passing brine from said second evaporator under gravity to said sludge thickening means, whereby liquor flows from the first evaporator through the second evaporator and to said sludge thickening means without being subjected to appreciable agitation or mechanical stimulus.

2. In combination in a crystallization apparatus, a primary vacuum evaporative chamber having an inlet, an outlet for cooled liquor, and a vapor outlet, means for removing gases and vapors from said chamber to effect cooling through vaporization of water vapor from the liquor therein, means for circulating the liquor from said chamber and back into said chamber, a secondary vacuum evaporative cooler of relatively smaller capacity than said first cooler having an inlet for liquor, an outlet for cooled liquor, and a vapor outlet, means for applying and maintaining a vacuum within said secondary cooler, and means for transferring liquor from said primary chamber to said secondary cooler, whereby liquor flows through said secondary cooler without being subjected to mechanical stimulus.

3. An apparatus for cooling liquors comprising a primary evaporator, means for maintaining the evaporator under reduced pressure whereby the liquor therein may be cooled by removal of heat of vaporization, means for forcibly circulating the liquor out of and back in said primary evaporator, means for introducing fresh liquor, a second evaporator, means for passing cooled liquor from said primary evaporator to said second evaporator, means for maintaining said second evaporator under reduced pressure thereby permitting further cooling of the liquor therein by removal of heat of vaporization, and means for discharging brine from said second evaporator in such manner that the brine passes but once through said second evaporator.

4. An apparatus for crystallizing salts from solution by cooling, which comprises a vacuum evaporative cooler, means for circulating solution into and out of said cooler, means for supplying fresh solution to said cooler to the external portion of said circulating means, a second evaporative cooler of relatively smaller capacity than said first cooler, a crystal separator disposed below said second cooler, and means for passing solution and formed crystals from the first cooler once only through said second cooler and to said crystal separator without subjecting such solution to mechanical stimulus during its passage through said second cooler to said crystal separator.

CHARLES F. RITCHIE.
WILLIAM A. GALE.
WILLIAM H. ALLEN.